United States Patent [19]
Hulsebosch et al.

[11] Patent Number: 5,625,535
[45] Date of Patent: Apr. 29, 1997

[54] COMPACT CONSTRUCTION FOR PORTABLE COMPUTER POWER SUPPLY

[76] Inventors: David A. Hulsebosch, 8006 White Marsh Ct., Spring, Tex. 77379; Richard A. Faulk, 12911 Forest Meadow, Cypress, Tex. 77429

[21] Appl. No.: 502,198

[22] Filed: Jul. 13, 1995

[51] Int. Cl.$^6$ .................................................. H05K 7/20
[52] U.S. Cl. ...................... 361/719; 257/659; 257/706; 361/687; 361/818
[58] Field of Search .................. 174/16.3, 35 R, 174/252; 165/80.3, 185; 257/659, 676, 691, 702, 706, 737, 786, 787, 778, 792, 795, 796, 921, 922; 361/687, 704, 705, 708–710, 707, 717–719, 720, 722, 800, 816, 818

[56] References Cited

U.S. PATENT DOCUMENTS

| | | | |
|---|---|---|---|
| 4,739,448 | 4/1988 | Rowe | 361/386 |
| 4,925,024 | 5/1990 | Ellenberger | 206/328 |
| 5,313,362 | 5/1994 | Hatada | 361/687 |
| 5,430,618 | 7/1995 | Huang | 361/816 |

FOREIGN PATENT DOCUMENTS

| | | | |
|---|---|---|---|
| 4279097A | 10/1992 | Japan | 361/720 |
| 3-241353 | 4/1993 | Japan | 361/720 |

*Primary Examiner*—Gerald P. Tolin

[57] ABSTRACT

A power supply module for a portable computer and a method of dissipating heat generated in the power supply module. The module comprises: (1) a circuit board having a plurality of power supply components mounted thereon, (2) a module electromagnetic shield at least partially surrounding the circuit board, the module electromagnetic shield electromagnetically shielding at least some of the plurality of power supply components, (3) metallic heat conduction paths, integrally disposed within the circuit board and substantially within a footprint of selected ones of the plurality of power supply components, for transferring heat from the selected ones of the plurality of power supply components through the circuit board and (4) compliant heat conduction pads, coupled between the circuit board and the module electromagnetic shield, for transferring the heat from the heat conduction paths to the module electromagnetic shield, the module electromagnetic shield dissipating the heat and thereby functioning as a heat sink, the heat conduction paths and heat conduction pads cooperating to form a compact structure for transferring heat from the selected ones of the plurality of power supply components to thereby reduce a required volume of the power supply module.

32 Claims, 2 Drawing Sheets

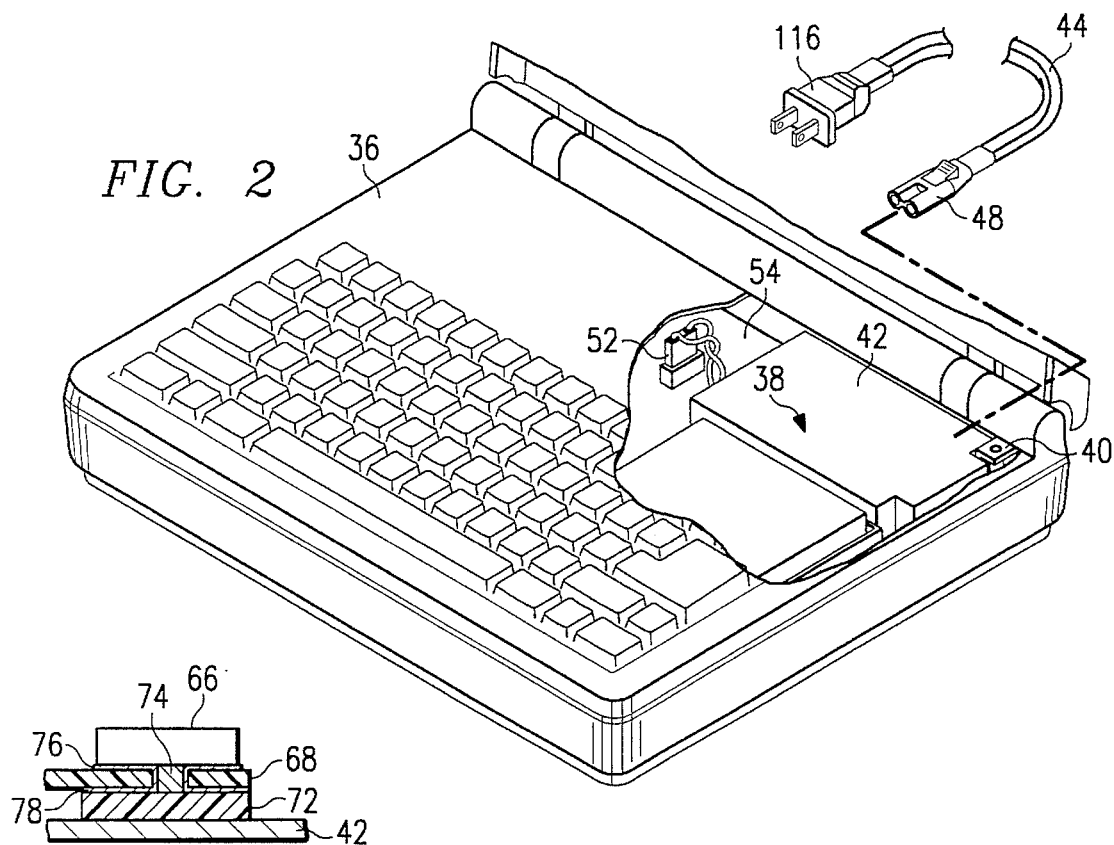
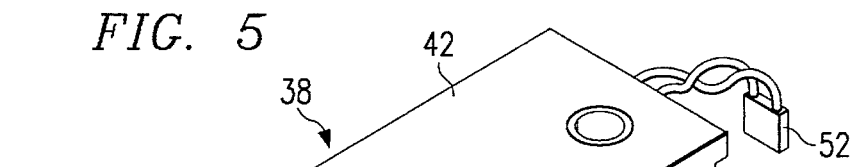
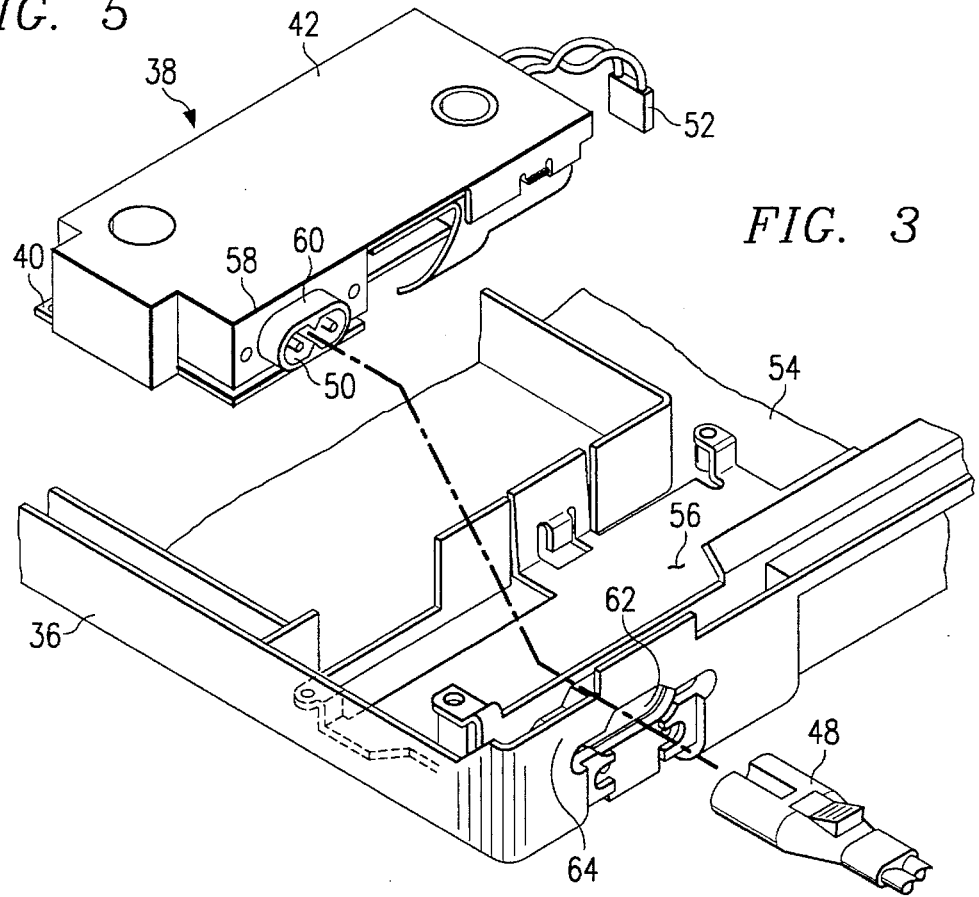

COMPACT CONSTRUCTION FOR PORTABLE COMPUTER POWER SUPPLY

CROSS-REFERENCE TO RELATED APPLICATION

This application is related to U.S. patent application Ser. No. 08/502,197, entitled "Portable Computer Having A Built-In AC Adapter Incorporating A Space Efficient Electromagnetic Interference Filter", filed on even date herewith, assigned to the Assignee of the present application and hereby incorporated by reference as if reproduced in its entirety.

BACKGROUND OF THE INVENTION

1. Field of the Invention

The present invention is directed, in general, to power supplies and, more specifically, to a power supply embodying a volume-efficient construction allowing the power supply to fit within the chassis of a portable computer system.

2. Description of Related Art

Portable, battery-powered computers have become increasingly popular over the last several years due to their light weight and small size that permit them to be easily hand-carried in an ordinary briefcase and used by business travelers in cramped spaces, such as on airline seat back trays, lacking electrical plug-in facilities. In fact, a particularly small type of portable computer, the notebook computer, is very popular, generally having dimensions of 8.5"×11" and a weight of less than 8 pounds. More recent developments in computer miniaturization have resulted in so-called "subnotebook" computers having still smaller dimensions.

The modern portable computer typically incorporates both hard and floppy disk drives, a display screen built into a pivoting display screen portion, and a keyboard built into a main chassis portion. It is thus a fully self-contained computer able to be conventionally used, for at least short periods of time, in situations and locations in which the use of a much larger desktop computer is simply not feasible.

As is well-known, however, even state-of-the-art portable computers have certain limitations and disadvantages, compared to their much larger desktop computer counterparts. One principal disadvantage is that portable computers are battery-powered and thus are subject to the limited life of the battery. Fortunately, however, almost all battery-powered portable computers are sold with an AC adapter. When plugged into a convenient source of AC power, the AC adapter converts the power into a form usable by the portable computer. The AC adapter comprises a line cord that plugs into the AC power source and an adapter cord that plugs into a designated power supply port usually on a backside of the portable computer main chassis. Power conversion is performed in a power supply that exists in the form of a power supply chassis separate from that of the portable computer and coupled between the line cord and adapter cord.

There are historical reasons for the power supply being housed in a separate power supply chassis. Because of notoriously tight volumetric constraints in portable computers main chassis, the components and subsystems therein have for years been the subject of constant, extensive design work directed toward making the components and subsystems as small as possible. Because the main chassis has always been fully occupied with necessary components and subsystems, there was no motivation to attempt to fit in less vital subsystems, such as the power supply. Thus, because prior art power supplies have been entirely external to the portable computer, they were never subjected to the intense miniaturization effort otherwise universally applied.

Accordingly, prior art separate supplies have been comparatively large and over-engineered. Heat-producing components in such supplies are most often cooled by mounting heat sinks to each component. The fins or projections of the heat sinks are bulky and heavy. The power supplies are surrounded by an electromagnetic interference ("EMI") shield to attenuate and guard against stray EMI. Thus, the prior art power supply chassis housing these power supplies and their associated shields have been correspondingly large, heavy and cumbersome, earning them the unflattering colloquial term "brick." The bulky and clumsy "brick" stood in stark contrast to the otherwise elegant and compact design of prior art portable computers.

Again, due to the tight volumetric requirements of components in the portable computer, it has not as yet been feasible to relocate the brick to within the portable computer main chassis. The power supply must undergo the same miniaturization effort through which the rest of the portable computer has already undergone. However, miniaturization of a power supply is not trivial. It not only entails an electrical redesign effort to minimize the size of the electronic components thereof, but also requires a fundamental rethinking of related mechanical, electromagnetic and thermal issues.

First, a volumetrically efficient means of mechanically attaching the power supply chassis within the portable computer chassis must be developed. Second, the power supply must be electromagnetically shielded from other components and subsystems in the portable computer, again, in a space-saving manner. Finally, and perhaps most critically, new techniques for removing heat from selected power supply components must be developed, as it is no longer acceptable to consume space with the individual finned heat sinks so often resorted to in the prior art.

Accordingly, what is needed in the art is a volume-efficient construction for a portable computer power supply that allows the power supply to fit within the confines of a portable computer system.

SUMMARY OF THE INVENTION

To address the above-discussed deficiencies of the prior art, it is a primary object of the present invention to provide a power supply that is of sufficiently-small volume to fit within a portable computer chassis, thereby eliminating the need for an external "brick."

In the attainment of the above-described primary object, the present invention provides a power supply module for a portable computer and a method of dissipating heat generated in the power supply module. The module comprises: (1) a circuit board having a plurality of power supply components mounted thereon, (2) a module electromagnetic shield at least partially surrounding the circuit board, the module electromagnetic shield electromagnetically shielding at least some of the plurality of power supply components, (3) metallic heat conduction paths, integrally disposed within the circuit board and substantially within a footprint of selected ones of the plurality of power supply components, for transferring heat from the selected ones of the plurality of power supply components through the circuit board and (4) compliant heat conduction pads, coupled between the circuit board and the module electromagnetic shield, for transferring the heat from the heat conduction paths to the module electromagnetic shield, the module electromagnetic shield dissipating the heat and thereby functioning as a heat sink, the heat conduction paths and heat conduction pads cooperating to form a compact structure for transferring heat from the selected ones of the plurality of power supply components to thereby reduce a required volume of the power supply module.

Thus, the present invention introduces a novel heat transfer route from the components of the power supply. The path liberates heat by collecting heat from an underside of the selected components, transferring the heat through the circuit board to an underside thereof, transferring the heat through compliant heat-conductive pads located under the circuit board to the surrounding electromagnetic shield and dissipating the heat in the shield. This new path allows prior art heat sinks (mounted over the components) to be eliminated, thereby decreasing the dimensions and volume of the module and rendering it suitable for integral inclusion within the portable computer.

In a preferred embodiment of the present invention, the heat conduction paths comprise heat-conductive metallic pads positioned on opposing sides of the circuit board that are in conductive contact with metal-sleeved vias extending through the circuit board. Metal-sleeved vias have long been employed to carry electrical current among various circuit board layers. However, such vias have not to-date been employed to advantage as heat conduits. The present invention therefore can use conventional circuit board production techniques to form heat conduction paths. Those of ordinary skill in the art will recognize that placement of other media of high thermal conductivity within the circuit board, such as embedded metal posts, is within the scope of the present invention.

In a preferred embodiment of the present invention, the heat conduction pads comprise thermally transmissive foam and at least partially mechanically mount the circuit board to the module electromagnetic shield. Such foam is commercially available, e.g., under the trade-name Chotherm™ and the physical properties of such are well known. However, it is new to employ foam as heat conduction pads under the circuit board.

In a preferred embodiment of the present invention, the module is a switching power supply, the selected ones of the plurality of power supply components being switching devices. Those of ordinary skill in the art understand that switching power supplies are in wide use with portable computers. However, such power supplies suffer from high heat output by the switching devices therein. The present invention is particularly advantageous at removing heat generated in the switching devices in switching-type power supplies.

In a preferred embodiment of the present invention, the module further comprises a line power input adapted to receive line power from an external source, the line power being at least 100 volts. As discussed previously, it is a primary object to integrate the power supply into the chassis of the portable computer. Accordingly, the module of the present invention is adapted to receive unconverted electrical power directly from a line power source, such as ubiquitous wall outlets.

In a related, preferred embodiment, the module is associated with a line cord having a plug end and an outlet end and adapted to deliver electrical power of at least 100 volts and at least 50 cycles per second from a power source (such as the wall outlet) coupled to the plug end to the power supply via the outlet end without power conversion.

In a preferred embodiment of the present invention, the module electromagnetic shield has mounts integral therewith to allow the module electromagnetic shield to be secured within a main chassis of the portable computer. Unlike the electromagnetic shield in a "brick," the electromagnetic shield of the present invention must adapt to the confines of a portable computer chassis. Accordingly, the module electromagnetic shield is provided with mounts to allow it to be secured to surrounding chassis walls and other modules.

In a preferred embodiment of the present invention, the module further comprises a motherboard connector allowing the module to be connected directly to a motherboard of the portable computer. Because the module of the present invention is integral with the main chassis, the prior art external connector between the power supply and the motherboard is no longer needed. Accordingly, the module has a direct motherboard connection associated therewith.

In a preferred embodiment of the present invention, the selected ones of the plurality of power supply components have multiple heat conduction paths associated therewith. Thus, the present invention allows the number of heat conduction paths to be selected so that the associated power supply component remains within its standard operating temperature range, neither undercooled nor overcooled.

In a preferred embodiment of the present invention, the module electromagnetic shield only partially surrounds the circuit board, a portion of the circuit board thereby exposed to an environment surrounding the module, the module electromagnetic shield cooperating with a main chassis electromagnetic shield of the portable computer to form an electromagnetic enclosure completely surrounding the circuit board when the module is secured within the main chassis electromagnetic shield.

The present invention realizes further gains in miniaturization of the power supply module by allowing the main chassis electromagnetic shield to form a portion of the overall shield for the power supply module. This is a significant preferred embodiment, as reductions of even fractions of an inch are valuable when adapting a power supply module to fit within the main chassis of a portable computer. Instead of simply providing overlapping module and main chassis electromagnetic shields, one thickness of the module electromagnetic shield is eliminated, further reducing module dimensions and volume.

In a preferred embodiment of the present invention, the portable computer is a portable PC. Those of skill in the art will readily find application for the present invention in all kinds of portable electrical devices that once required separate power supplies. Thus, the present invention is not limited to application in portable PCs.

Thus, with application of some or all of the above embodiments, the present invention yields a portable PC, comprising: (1) a main chassis hingedly coupled to a display screen chassis to allow the portable PC to assume alternative stowed and deployed positions, (2) a display screen associated with the display screen chassis, (3) an input device and an externally-accessible storage device associated with the main chassis and (4) a motherboard and a plurality of modules contained within the main chassis, one of the plurality of modules being a power supply module, comprising: (a) a circuit board having a plurality of power supply components mounted thereon, (b) a module electromagnetic shield partially surrounding the circuit board, the module electromagnetic shield cooperating with a main chassis electromagnetic shield of the main chassis to form an electromagnetic enclosure for the circuit board when the module is secured within the main chassis electromagnetic shield to thereby reduce a required volume of the power supply module.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as broadly defined.

BRIEF DESCRIPTION OF THE DRAWING

For a more complete understanding of the present invention, and the advantages thereof, reference is now made to the following descriptions taken in conjunction with the accompanying drawings, in which:

FIG. 2 illustrates a partially cut-away isometric view of a portable computer chassis including a power supply module embodying the construction of the present invention;

FIG. 3 illustrates a rearside isometric view of the portable computer chassis of FIG. 2 with the power supply module exploded therefrom for clarity;

FIG. 5 illustrates a sectional view of a heat dissipation structure within the power supply module of FIG. 4, taken along lines 5—5.

DETAILED DESCRIPTION

Figure 1:
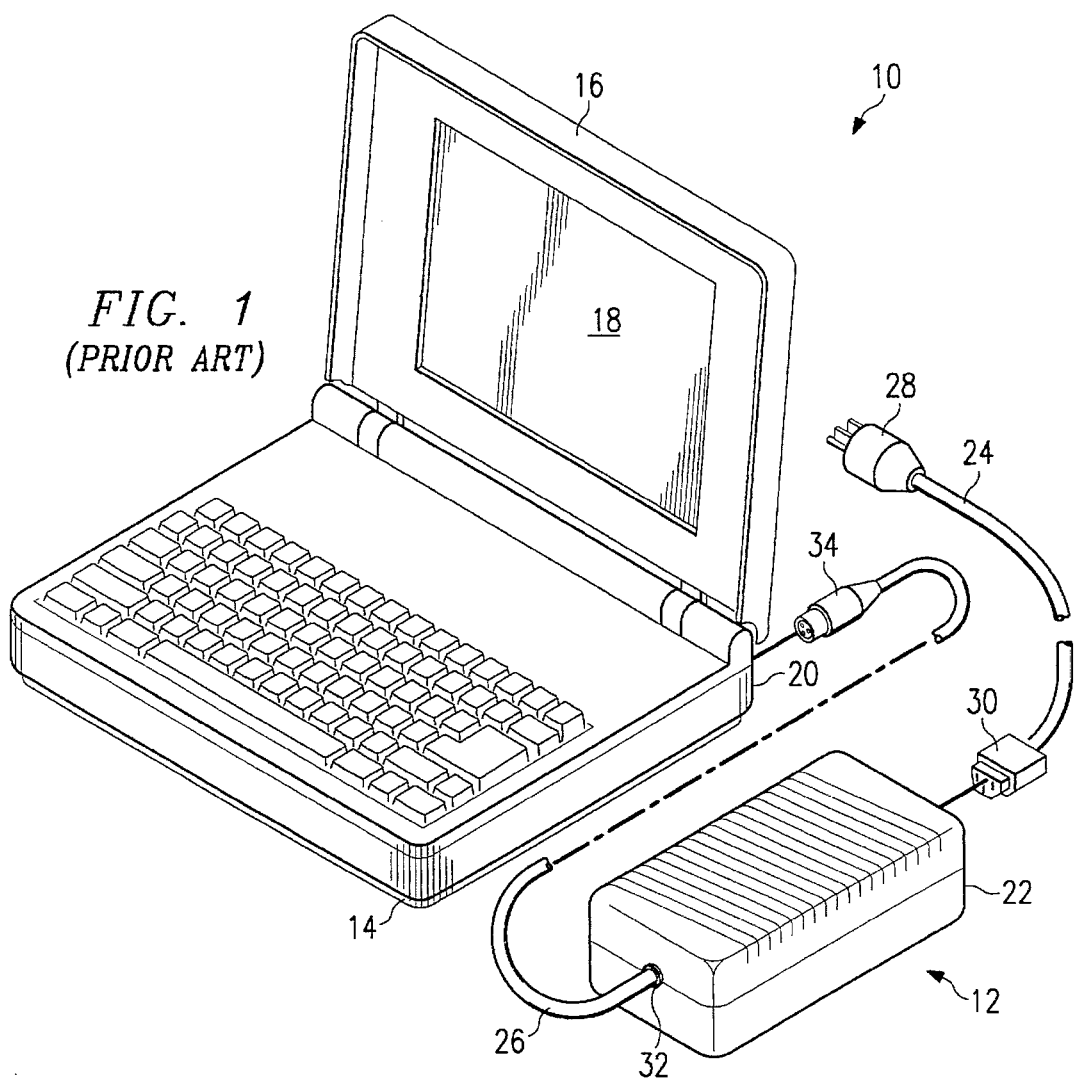
FIG. 1 illustrates an isometric view of a prior art portable computer and an associated power supply "brick;"

Referring initially to FIG. 1, illustrated is an isometric view of a prior art portable computer 10 and an associated power supply "brick" 12 that is exterior to the prior art portable computer 10. Typically, the brick 12 is designed to convert alternating current ("AC") power to a form usable by the prior art portable computer 10. As is well known, portable computers are typically designed to run on direct current ("DC"), which is usually supplied by an internal DC battery (not shown). The DC battery is recharged by the user plugging the power supply brick 12 into a conventional AC outlet that supplies the AC, which is converted into DC by the power supply brick 12. Alternatively, direct DC operational power may be supplied to the prior art portable computer 10 from the AC source via the power supply brick 12.

As seen in FIG. 1, the prior art portable computer 10 has a base member 14 and a lid member 16 with a screen portion 18 therein. The base member 14 is comprised of a computer base housing 20 that houses the internal electrical components of the prior art portable computer 10. The power supply brick 12 has a brick housing 22 that surrounds and houses the internal electrical components of the power supply brick 12, which convert the electrical power from AC to direct current DC.

A distinct disadvantage associated with the conventional power supply brick 12 is that it has an overall height or thickness that exceeds the overall thickness of the computer base housing 20. Thus, it must be carried and used externally from the computer base housing 20. Additionally, the weight of the power supply brick 12 adds substantially to the total weight associated with the prior art portable computer 10.

The power supply brick 12 is also cumbersome to use and store because of the line cords associated with it. Typically, the power supply brick 12 has two electrical line cords associated with it, an AC cord 24 and a DC cord 26, both of which are individually connectable to the power supply brick 12. The AC cord 24 has a first end 28 that is designed to be electrically connected to an AC power supply (not shown) and a second end 30 that is designed to be electrically connected to the power supply brick 12. The DC cord 26 has a first end 32 that is designed to be electrically connected to the power supply brick 12 and a second end 34 that is designed to be electrically connected to the prior art portable computer 10. From these disadvantages, it is clear that a need has arisen for a portable computer with a lightweight, heat dissipating adapter that can fit within the chassis of the portable computer.

Turning now to FIG. 2, in a preferred embodiment thereof, illustrated is a partially cut-away isometric view of a portable computer chassis 36 having a built-in power supply module 38 embodying the construction of the present invention. The portable computer chassis 36 is generally of conventional design with the exception that it is designed to completely contain the miniaturized power supply module 38 within the portable computer chassis 36. Preferably, the power supply module 38 has mounts 40 integral therewith so that it may be secured within the portable computer chassis 36. The power supply module 38 is at least partially surrounded by a module electromagnetic shield 42. The power supply module 38 is extremely light-weight and has a miniaturized size and construction that allows it to be completely contained within the portable computer chassis 36. These distinct advantages reduce the bulkiness and the weight associated with conventional adapter devices. Moreover, because the power supply module 38 is secured within the portable computer chassis 36, the user does not have to handle a heavy, cumbersome brick with it plurality of cords, but can instead, fully utilize the power supply module 38 simply by plugging a cord into it and an appropriate power source.

Associated with the power supply module 38 is a single line power cord 44 that has a first end 46 designed to be electrically connected to a conventional external power supply outlet of at least 100 volts and at least 50 cycles, and a second end 48 designed to be connected directly to a line power input 50 of the power supply module 38. Preferably, the line power cord 44 is an electrical cord that is adapted to be connected to conventional outlets found throughout most nations in the world. More preferably, however, the line power cord 44 is adapted to be connected to a 110 volt, 60 cycle outlet. The power supply module 38 also preferably includes a motherboard connector 52 that enables the power supply module 38 to be removably connected directly to a motherboard 54 positioned within the portable computer chassis 36.

Turning now to FIG. 3, illustrated is a rearside isometric view of the portable computer chassis 36 of FIG. 2 with the power supply module exploded therefrom for clarity. In this view, the module electromagnetic shield 42 of the power supply module 38 is clearly illustrated. As seen in this preferred embodiment, the module electromagnetic shield 42 partially surrounds a circuit board (not shown) of the power supply module 38. The module electromagnetic shield 42 cooperates with a main chassis electromagnetic shield 56 of the portable computer chassis 36 to form an electromagnetic enclosure around the power supply module's 38 circuit board when the power supply module 38 is secured within the main chassis electromagnetic shield 56. While the embodiment illustrated shows the module electromagnetic shield 42 only partially surrounding the power supply components, it will be appreciated that the module electromagnetic shield 42 could be made to completely surround the power supply components.

Positioned on a rear end portion 58 of the power supply module 38 is the line power input 50 that is adapted to receive electrical power directly from an external source via the line power cord 44. The line power input 50 preferably has a projecting retaining shell 60 that is designed to frictionally engage and hold the second end 48 of the line power cord 44. The shell 60 is also designed to extend through aperture 62 formed in a side wall 64 of the portable computer chassis 36, thereby providing easy accessibility to connect the line power cord 44 to the power supply module 38. The power supply module 38 may be positioned in the portable computer chassis 36 by tilting the rear end portion 58 in a downwardly fashion and positioning the projecting retaining shell 60 through the aperture 62.

Figure 4:
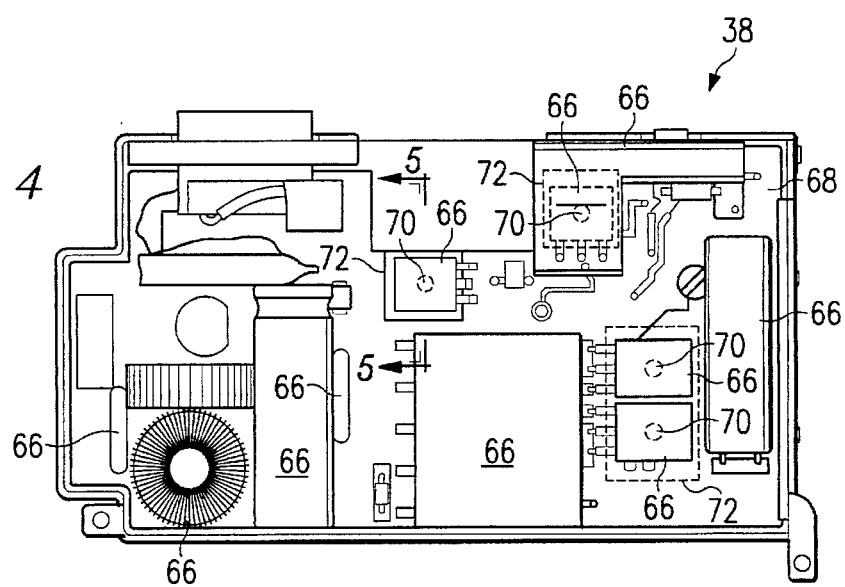
FIG. 4 illustrates a plan view of the power supply module of FIG. 3.

Turning now to FIG. 4, illustrated is a plan view of the power supply module of FIG. 3. In this view, a representative plurality of power supply components 66 mounted on the previously mentioned circuit board 68 are clearly shown. As used herein, the term power supply components means any electrical component that is used directly, or indirectly to supply power to an electronic device. The remaining power supply components are hidden from view by a plastic shield. In a preferred embodiment, the power supply module 38 is a switching power supply module wherein selected ones of the plurality of the power supply components 66 are switching devices, such as transistors. More preferably, however, the switching power supply module 38 is an AC adapter wherein AC is converted to DC, a form of electrical power that can be used by the portable computer. Further details regarding the AC adapter, which itself includes a reduced volume electromagnetic interference filter, are set forth in copending U.S. patent application Ser. No. 08/502, 197 (Atty. Docket No. CMPQ-0783), filed on even date herewith and previously incorporated by reference.

The power supply components 66 of the power supply module 38, particularly components such as transistors, generate significant amounts of heat that require dissipation to prevent harmful build-up of heat within the portable computer chassis 36. In the conventional brick devices, dissipation of heat was not of paramount importance because the brick was located outside the chassis, but this still required heat production devices to be attached to large heat sink devices, which also contributed to the brick device's large size. However, in the present invention where the power supply module 38 is positioned within the portable computer chassis 36, heat dissipation can be a significant problem.

To address this problem, the present invention also includes metallic heat conduction paths 70 integrally disposed within the circuit board 68 of the power supply module 38 for transferring heat from the power supply components 66 through the circuit board 68 and to the module electromagnetic shield 42. Preferably, there are a plurality of heat conduction paths 70 associated with each of the power supply components 66. The metallic heat conduction paths 70 are disposed substantially within a footprint of the power supply components 66. Coupled between the circuit board 68 and the module electromagnetic shield 42 are compliant heat conduction pads 72. The heat conduction pads 72 transfer the heat from the heat conduction paths 70 to the module electromagnetic shield 42, which then dissipates the heat over a wider surface area. The metallic heat conduction paths 70 cooperating with the heat conduction pads 72 and the electromagnetic shield function to form a compact heat sink structure for transferring heat from the power supply components 66. Of course, it will be appreciated that multiple heat conduction paths 70 may be associate with each of the power supply components 66, if so desired.

Turning now to FIG. 5, illustrated is a sectional view of a heat dissipation structure within the power supply module of FIG. 4, taken along lines 5—5. The power supply component 66, from which heat dissipation is required, is positioned on a heat-conductive metallic pad 76. Preferably, the metallic pad 76 is a copper trace formed on the circuit board 68 and is integrally connected to the metal-sleeved via 74. In a preferred embodiment, the metallic pad 76 also covers the footprint of the power supply component 66. The metallic pad 76, in turn, covers the heat conduction path 70. Heat is conducted from the power supply component 66 by the metallic pad 76 and is then conducted from the metallic pad 76 via the heat conduction path 70. The heat conduction paths 70 are preferably comprised of heat-conductive, metal-sleeved vias 74 that extend through the circuit board 68, which are overlaid by the metallic pad 76. Positioned on the opposite side of and in contact with the circuit board 68 and the metal-sleeved via 74 is another heat-conductive metallic pad 78. The heat-conductive pad 78 is also preferably a copper trace formed on the printed circuit board 68 and is integrally formed with the metal-sleeved via. Overlaying the entire footprint of the metallic pad 78 is the heat conduction pad 72 that is preferably comprised of a thermally transmissive foam.

As heat is generated by the power supply component 66, the metallic pad 76 conducts the heat from the power supply component to the via 74, which then conducts the heat from the metallic pad 76 to the metallic pad 78. The heat is then conducted from the metallic pad 78 to the heat conduction pad 72. The heat conduction pad 72 is in contact with the module electromagnetic shield 42, which conducts the heat away from the heat conduction pad 72. Preferably, the heat conduction pad 72 has adhesive on its sides that contact the circuit board 68 and the module electromagnetic shield 42, which not only help holds the thermally transmissive foam in place, but also partially mechanically mounts the circuit board 68 to the module electromagnetic shield 42. In a more preferred embodiment, however, the heat conduction pad 72 has an inherent adhesive property that does not require the application of adhesive to the heat conduction pad 72.

While the heat conduction paths 70 and corresponding heat conduction pads 72 may be associated with each heat generating power supply component 66, it is preferable that they each be associated with the power supply components 66 that conduct the most heat. Such heat producing devices include switching devices, which are also surface mounted to optimize further heat transfer therefrom.

From the above description, it is apparent that the present invention provides a power supply module for a portable computer and a method of dissipating heat generated in the power supply module. The module comprises: (1) a circuit board having a plurality of power supply components mounted thereon, (2) a module electromagnetic shield at least partially surrounding the circuit board, the module electromagnetic shield electromagnetically shielding at least some of the plurality of power supply components, (3)

metallic heat conduction paths, integrally disposed within the circuit board and substantially within a footprint of selected ones of the plurality of power supply components, for transferring heat from the selected ones of the plurality of power supply components through the circuit board and (4) compliant heat conduction pads, coupled between the circuit board and the module electromagnetic shield, for transferring the heat from the heat conduction paths to the module electromagnetic shield, the module electromagnetic shield dissipating the heat and thereby functioning as a heat sink, the heat conduction paths and heat conduction pads cooperating to form a compact structure for transferring heat from the selected ones of the plurality of power supply components to thereby reduce a required volume of the power supply module.

Although the present invention and its advantages have been described in detail, it should be understood that various changes, substitutions and alterations can be made herein without departing from the spirit and scope of the invention as broadly defined.

What is claimed is:

1. A switching power supply module for a portable personal computer (PC), comprising:

a circuit board having a plurality of power supply switching devices mounted thereon;

a module electromagnetic shield at least partially surrounding said circuit board, said module electromagnetic shield electromagnetically shielding at least some of said plurality of power supply switching devices, said module electromagnetic shield having mounts integral therewith to allow said module electromagnetic shield to be secured within a main chassis of said portable PC;

metal-sleeved vias extending through said circuit board and substantially disposed within a footprint of selected ones of said plurality of power supply switching devices, for transferring heat from said selected ones of said plurality of power supply switching devices through said circuit board;

thermally transmissive foam, coupled between said circuit board and said module electromagnetic shield, for transferring said heat through said metal-sleeved vias to said module electromagnetic shield, said module electromagnetic shield dissipating said heat and thereby functioning as a heat sink; and heat-conductive metallic pads coupled to said circuit board substantially within a footprint of said power supply switching devices and said thermally transmissive foam, said heat-conductive metallic pads in physical contact with said metal-sleeved vias, said heat-conductive metallic pads, metal-sleeved vias and thermally transmissive foam cooperating to form a compact structure for transferring heat from said selected ones of said plurality of power supply switching devices to thereby reduce a required volume of said power supply module.

2. The module as recited in claim 1 wherein said thermally transmissive at least partially mechanically mounts said circuit board to said module electromagnetic shield.

3. The module as recited in claim 2 wherein said selected ones of said plurality of power supply switching devices have multiple ones of said metal-sleeved vias associated therewith.

4. The module as recited in claim 3 wherein said module electromagnetic shield only partially surrounds said circuit board, a portion said circuit board thereby exposed to an environment surrounding said module, said module electromagnetic shield cooperating with a main chassis electromagnetic shield of said portable PC to form an electromagnetic enclosure completely surrounding said circuit board when said module is secured within said main chassis electromagnetic shield.

5. The module as recited in claim 4 further comprising heat-conductive metallic pads coupled to said circuit board and substantially within each of said footprints of said selected ones of said plurality of power supply switching devices, said heat-conductive metallic pads positioned between said circuit board and each of said selected ones of said plurality of power supply switching devices substantially within said power supply switching devices footprint and in physical contact with each of said metal-sleeved vias for transferring heat from each of said selected ones of said plurality of power supply switching devices.

6. The module as recited in claim 5 further comprising a motherboard connector allowing said module to be connected directly to a motherboard of said portable PC.

7. A power supply module for a portable computer, comprising:

a circuit board having a plurality of power supply components mounted thereon;

a module electromagnetic shield at least partially surrounding said circuit board, said module electromagnetic shield electromagnetically shielding at least some of said plurality of power supply components;

a heat conduction path, integrally disposed within said circuit board and substantially within a footprint of a selected one of said plurality of power supply components, for transferring heat from said selected one of said plurality of power supply components through said circuit board; and a compliant heat conduction pad, coupled between said circuit board and said module electromagnetic shield, for transferring said heat from said heat conduction path to said module electromagnetic shield, said module electromagnetic shield dissipating said heat and thereby functioning as a heat sink, said heat conduction path and heat conduction pad cooperating to form a compact structure for transferring heat from said selected one of said plurality of power supply components to thereby reduce a required volume of said power supply module.

8. The module as recited in claim 7 wherein said heat conduction path comprises a heat-conductive metallic pad positioned between said circuit board and said selected one of said plurality of power supply components substantially within a footprint of said selected one of said plurality of power supply components, and further comprising a metal-sleeved via extending through said circuit board in physical contact with said heat-conductive metallic pad.

9. The module as recited in claim 7 wherein said heat conduction pad comprises thermally transmissive foam and at least partially mechanically mount said circuit board to said module electromagnetic shield.

10. The module as recited in claim 7 wherein said module is a switching power supply, said selected ones of said plurality of power supply components being switching devices.

11. The module as recited in claim 7 further comprising a plurality of heat conduction paths integrally disposed within said circuit board and substantially within footprints of selected ones of said plurality of power supply components.

12. The module as recited in claim 7 further comprising a motherboard connector allowing said module to be connected directly to a motherboard of said portable computer.

13. The module as recited in claim 7 wherein said selected one of said plurality of power supply components has multiple heat conduction paths associated therewith.

14. The module as recited in claim 7 wherein said module electromagnetic shield only partially surrounds said circuit board, a portion of said circuit board thereby exposed to an environment surrounding said module, said module electromagnetic shield cooperating with a main chassis electromagnetic shield of said portable computer to form an electromagnetic enclosure completely surrounding said circuit board when said module is secured within said main chassis electromagnetic shield.

15. The module as recited in claim 7 wherein said heat conduction path comprises a heat-conductive metallic pad positioned between said circuit board and said compliant heat conduction pad substantially within a footprint of said compliant heat conduction pad, and further comprising a metal-sleeved via extending through said circuit board in physical contact with said heat-conductive metallic pad.

16. A method of dissipating heat generated in a power supply module for a portable computer, said module including a circuit board having a plurality of power supply components mounted thereon and a module electromagnetic shield at least partially surrounding said circuit board, said module electromagnetic shield electromagnetically shielding at least some of said plurality of power supply components, said method comprising the steps of:

initially transferring heat from said selected ones of said plurality of power supply components through metallic heat conduction paths integrally disposed within said circuit board and substantially within a footprint of selected ones of said plurality of power supply components; and subsequently transferring said heat from said heat conduction paths to said module electromagnetic shield via compliant heat conduction pads, coupled between said circuit board and said module electromagnetic shield, said module electromagnetic shield dissipating said heat and thereby functioning as a heat sink, said heat conduction paths and heat conduction pads cooperating to form a compact structure for transferring heat from said selected ones of said plurality of power supply components to thereby reduce a required volume of said power supply module.

17. The method as recited in claim 16 wherein said step of initially transferring comprises the steps of initially transferring said heat from said selected ones of said plurality of power supply components to heat-conductive metallic pads in physical contact with and substantially within said footprint of said selected ones of said plurality of power supply components and transferring said heat from said heat-conductive metallic pads through metal-sleeved vias extending through said circuit board.

18. The method as recited in claim 16 wherein said step of subsequently transferring comprises the step of subsequently transferring said heat through thermally transmissive foam, said heat conduction pads at least partially mechanically mount said circuit board to said module electromagnetic shield.

19. The method as recited in claim 16 further comprising the step of securing said module electromagnetic shield within a main chassis of said portable computer with mounts integral with said module electromagnetic shield.

20. The method as recited in claim 16 wherein said step of initially transferring comprises the step of initially transferring said heat through multiple heat conduction paths associated with said selected ones of said plurality of power supply components.

21. The method as recited in claim 16 wherein said module electromagnetic shield only partially surrounds said circuit board, a portion of said circuit board thereby exposed to an environment surrounding said module, said method further comprising the step of electromagnetically enclosing said circuit board when said module is secured within a main chassis electromagnetic shield of said portable computer, said module electromagnetic shield cooperating with said main chassis electromagnetic shield to form an electromagnetic enclosure.

22. The method as recited in claim 16 wherein said step of subsequently transferring heat from said heat conduction paths comprises the steps of transferring said heat from metal-sleeved vias to heat-conductive metallic pads in physical contact with and positioned between said metal-sleeved vias and said compliant heat conduction pads and transferring said heat from said heat conduction pads to said module electromagnetic shield.

23. A portable personal computer (PC), comprising:

a main chassis hingedly coupled to a display screen chassis to allow said portable PC to assume alternative stowed and deployed positions;

a display screen associated with said display screen chassis;

an input device and an externally-accessible storage device associated with said main chassis; and a motherboard and a plurality of modules contained within said main chassis, one of said plurality of modules being a power supply module, comprising:

a circuit board having a plurality of power supply components mounted thereon, and a module electromagnetic shield partially surrounding said circuit board, said module electromagnetic shield cooperating with a main chassis electromagnetic shield of said main chassis to form an electromagnetic enclosure for said circuit board when said module is secured within said main chassis electromagnetic shield to thereby reduce a required volume of said power supply module.

24. The PC as recited in claim 23 wherein said power supply module further comprises:

metallic heat conduction paths, integrally disposed within said circuit board and substantially within a footprint of selected ones of said plurality of power supply components, for transferring heat from said selected ones of said plurality of power supply components through said circuit board, and compliant heat conduction pads, coupled between said circuit board and said module electromagnetic shield, for transferring said heat from said heat conduction paths to said module electromagnetic shield, said module electromagnetic shield dissipating said heat and thereby functioning as a heat sink, said heat conduction paths and heat conduction pads cooperating to form a compact structure for transferring heat from said selected ones of said plurality of power supply components.

25. The portable PC as recited in claim 24 wherein said heat conduction paths further comprise a heat-conductive metallic pad positioned between said circuit board and said selected ones of said plurality of power supply components substantially within a footprint of said selected ones of said plurality of power supply components, and further comprising metal-sleeved vias extending through said circuit board in physical contact with said heat-conductive metallic pads.

26. The portable PC as recited in claim 24 wherein said heat conduction pads comprise thermally transmissive foam and at least partially mechanically mount said circuit board to said module electromagnetic shield.

27. The portable PC as recited in claim 24 wherein said module is a switching power supply, said selected ones of said plurality of power supply components being switching devices.

28. The portable PC as recited in claim 24 wherein said module electromagnetic shield has mounts integral therewith to allow said module electromagnetic shield to be secured within said main chassis.

29. The portable PC as recited in claim 24 further comprising a motherboard connector allowing said module to be connected directly to said motherboard.

30. The portable PC as recited in claim 24 wherein said selected ones of said plurality of power supply components have multiple heat conduction paths associated therewith.

31. The portable PC as recited in claim 24 further comprising a line power input externally accessible through said main chassis and adapted to receive line power from an external source, said line power being at least 100 volts.

32. The portable PC as recited in claim 24 further comprising a line cord having a plug end and an outlet end and adapted to deliver electrical power of at least 100 volts and at least 50 cycles per second from a power source coupled to said plug end to said power supply via said outlet end without power conversion.

* * * * *